US007929717B2

(12) United States Patent
Okabayashi et al.

(10) Patent No.: US 7,929,717 B2
(45) Date of Patent: Apr. 19, 2011

(54) AUDIO MIXING CONSOLE

(75) Inventors: Masaaki Okabayashi, Hamamatsu (JP); Taku Nishikori, London (GB)

(73) Assignee: Yamaha Corporation, Hamamatsu-shi (JP)

( * ) Notice: Subject to any disclaimer, the term of this patent is extended or adjusted under 35 U.S.C. 154(b) by 1374 days.

(21) Appl. No.: 11/377,460

(22) Filed: Mar. 15, 2006

(65) Prior Publication Data

US 2006/0210098 A1 Sep. 21, 2006

(30) Foreign Application Priority Data

Mar. 17, 2005 (JP) ................................ 2005-076683
Mar. 17, 2005 (JP) ................................ 2005-076684

(51) Int. Cl.
*H04B 1/00* (2006.01)

(52) U.S. Cl. .................. 381/119; 369/3; 369/4; 84/625; 84/660

(58) Field of Classification Search .................. 381/119, 381/118, 109; 700/94; 369/3–4; 84/625, 84/660, 609–610, 634, 649, 650, 666
See application file for complete search history.

(56) References Cited

U.S. PATENT DOCUMENTS

| | | | | |
|---|---|---|---|---|
| 7,239,947 | B2 * | 7/2007 | Suzuki | 701/36 |
| 7,697,703 | B2 * | 4/2010 | Okabayashi et al. | 381/119 |
| 2002/0188364 | A1 * | 12/2002 | Ota et al. | 700/94 |
| 2004/0184625 | A1 * | 9/2004 | Okabayashi et al. | 381/119 |
| 2005/0157830 | A1 * | 7/2005 | Ota et al. | 375/377 |

FOREIGN PATENT DOCUMENTS

JP 2004-253876 9/2004

OTHER PUBLICATIONS

Digital Production Console DM 2000 Instruction Manual, Yamaha Corporation, Japan.
Digital Production Console, DM2000, Instruction Manual, Yamaha Corporation, pp. 4-5.
PM5D/PM5D-RH Owner's Manual, pp. 13, 14, 135, 136 and 282, Yamaha Corporation.
PM5D/PM5D-RH, Owner's Manual, Yamaha Corporation.
PM5D/PM5D-RH Owner's Manual, pp. 13, 14, 18-20, 36, 37, 56-64, 134, 145 243, and 280-282.

* cited by examiner

*Primary Examiner* — Devona E Faulk
*Assistant Examiner* — Disler Paul
(74) *Attorney, Agent, or Firm* — Morrison & Foerster LLP

(57) ABSTRACT

In an audio mixing console, a channel strip section is disposed on an operation panel on the basis of a group, which is derived by classifying a plurality of input channels and output channels in groups, and using channel strips provided to the channel strip section, a parameter setting can be performed for each of the channels. In such an audio mixing console, an assignment channel strip section is provided on the center portion of the operation panel for enhancing operability, and the respective channels of the group are each assigned to their corresponding assignment channel strips through operation of a group selection operation member to enable the parameter setting. In a group selection operation section including the group selection operation members on the operation panel, the group selection operation members are disposed in a corresponding manner to the disposition positions of the channel strip sections on the operation panel. Through such disposition, it becomes possible to readily recognize which group of the channel strip section is assigned to the assignment channel strip section.

12 Claims, 12 Drawing Sheets

AUDIO MIXING CONSOLE

BACKGROUND OF THE INVENTION

1. Technical Field

The present invention relates to an audio mixing console for a digital mixer apparatus that processes sound signals and, more specifically, to an audio mixing console for use in a mixer apparatus that enhances operability for operators even with a great number of operation controls.

2. Background Art

A conventionally known mixer apparatus is of a type receiving sound signals from various types of sound signal sources, e.g., microphone, then performing processes of mixing, effects application, volume level control, or others, and outputting the resulting processed sound signals to various types of output equipment, e.g., amplifier, speaker, or others. Recently developed is a digital mixer that goes through internal signal processing in digital. Such a mixer apparatus is provided with an audio mixing console (operation panel) on which a number of operation members and displays are disposed for operators' operation (for example, refer to Non-Patent Document, YAMAHA, Digital Production Console DM2000 Instructions for use).

The operation panel of the mixer apparatus is provided thereon with a channel strip section, a selection channel operation section, a display section, a scene operation section, and others. The channel strip section is a section of the panel in which a plurality of channel strips are arranged. A channel strip includes a switch and a fader for use in parameter setting change of a channel. A plurality of input channels and a plurality of output channels are layer-divided into a plurality of layers, and a plurality of input/output channels of any one of the layers selected by a layer selection switch is assigned to the channel strip section. For example, assuming that the channel strip section is configured by eight channel strips, when the layer selection switch selects a first layer, the channel strip section is allowed to operate the first to eighth channels. When a second layer is selected, the channel strip section is allowed to operate the ninth to sixteenth channels. Such a configuration enables parameter setting operation for a larger number of input channels and output channels with the less number of channel strips.

The selection channel operation section is a part of the panel including a plurality of operation members for use in setting of various parameters of a channel. Although the channel strip can perform setting for predetermined parameters of the respective channels, if parameter setting change is required for a specific channel with more particularities, the channel is selected (for channel selection, a selection switch provided to the channel strip is used, for example), and parameter setting change of the selected channel can be performed with more detail using the selection channel operation section. In this manner, it becomes possible to quickly operate a plurality of parameters specifically for a target channel.

The display section is a part of the panel for use of displaying any page selected from a plurality of pages. For page selection for display, operating one of a plurality of page selection switches that are provided on a page basis will do. As another technique, various parameters of the selected channel may be displayed on the display section, a cursor may be placed on one of the parameters, a parameter change may be made using a common parameter input wheel, and an enter key may be used for confirmation. There is also a digital mixer of a type in which a display section is configured by a touch panel including a position sensor that detects the position touched by a finger. Operating the touch panel enables value control over displayed parameters or selection of the parameters (through value operation using a universal ten-key pad or a universal knob).

In the above-described conventional technology, with such a mixer including a plurality of channel strips on the operation panel, an operator has to extend his or her hand to operate a large number of channel strips scattered over a wide range of the panel. When the operation panel is laterally wide in width, the operator has to operate it while moving right and left. If the panel is with layer switching, the operator has to go through layer check before operating the channel strips, and for such layer check, the operator has to read the name of the layer switch that is turned on.

If it is with a touch panel, there are problems of a difficulty of adjusting the parameter value being delicate, and the display surface gets dirty. Moreover, even when the operator touches the screen for parameter selection, the operation may possibly erroneously change the parameter values, thereby requiring careful operation.

When the layer selection switch selects any specific layer, the display section displays a setting state for a plurality of channels of the selected layer, and when a predetermined selection switch selects a channel, displayed is a setting state of the selected channel. Moreover, an operation member in the vicinity of the display section serves to change the assignment state of parameters changeable by the operation member in accordance with the display details of the display section. As such, the display section displays various types of screen, and therefore, an operator has to come closer to the display section to check the displayed objects, or otherwise he or she cannot find the assignment state of the operation members in the vicinity of the display.

SUMMARY OF THE INVENTION

An object of this invention is to provide an audio mixing console for a digital mixer or others, being easily operable by operators, and specifically being free from the inconvenience of layer check, and free from the inconvenience when a touch panel is used.

Another object of this invention is to provide an audio mixing console for a digital mixer or others, being easily operable by operators, and specifically allowing the operators to easily identify and change, for execution, between a parameter operation based on a screen displaying parameters of a plurality of channels and a parameter operation based on another screen displaying parameters of selected one channel.

To achieve these objects, this invention is directed to an audio mixing console having an operation panel for operating a mixer apparatus which inputs audio signals and outputs the audio signals after application of various types of signal processing to the audio signals. The inventive audio mixing console comprises: a plurality of channels provided at input side and output side of the mixer apparatus for applying the various types of the signal processing to the audio signals, the plurality of the channels being grouped into a multiple of groups such that each group contains n number of channels where n is an integer of 2 or greater; a current memory that stores a plurality of parameters for each of the channels for defining the signal processing applied by each channel; a multiple of channel strip sections disposed on the operation panel in correspondence to the multiple of the groups, each channel strip section including n pieces of channel strips in correspondence to the n number of the channels of the corresponding group, each channel strip including operation members being operable for setting the parameters of the corresponding channel; a display section provided on the operation panel; an assignment channel strip section being disposed under the display section on the operation panel, and including n pieces of assignment channel strips each having operation members including a knob and a fader; a group selection operation section including a multiple of group selection operation members, which correspond to the multiple of the channel strip sections and which are arranged at positions within the group selection operation section associatively to positions of the channel strip sections disposed on the operation panel; a group selection section that operates when one of the group selection operation members is operated in the group selection operation section for selecting one of the channel strip sections corresponding to the operated group selection operation member, then assigns the n member of the channels of the selected channel strip section to the n pieces of the assignment channel strips of the assignment channel strip section, and displays on the display section a setting state of the parameters of the n number of the channels of the selected channel strip section assigned to the assignment channel strip section; and a parameter control section that changes the setting states of the parameters of the channels of the selected channel strip section stored in the current memory when the operation members of the assignment channel strips are operated.

In short, a channel strip section is disposed on an operation panel on the basis of a group, which is derived by classifying a plurality of input channels and output channels in groups, and using channel strips provided to the channel strip section, a parameter setting change can be performed for each of the channels. In such an audio mixing console, the assignment channel strip section is provided on the center portion of the operation panel, for example, for enhancing operators' operability, and the channels of one group are each assigned to their corresponding assignment channel strips through operation of a group selection operation member to enable the parameter setting change. In a group selection operation section including the group selection operation members on the operation panel, the group selection operation members are disposed in a corresponding manner to the disposition position of the channel strip sections on the operation panel. Through such disposition, it becomes possible to easily recognize which group of the channel strip section assigned to the assignment channel strip section.

In a preferred form, when displaying the setting state of the plurality of the parameters of the n member of the channels on the display section, the group selection section graphically presents on the display section an on/off operation member which represents a binary setting state of a binary parameter and a level operation member which represents a quantitative setting state of a numerical parameter, the display section is provided with a position sensor that can detect an operation position on the display section, and when the position sensor detects an operation position, the parameter control section operates in case that the on/off operation member is located at the detected operation position, for inverting the binary setting state of the binary parameter corresponding to the on/off operation member, and for inverting a display mode of the on/off operation member.

Further, when the position sensor detects an operation position, the parameter control section operates in case that the level operation member is located at the detected operation position, for selecting n pieces of the level operation members corresponding not only to the channels of the operated level operation member but also to the remaining channels of the channel strip section currently assigned to the assignment channel strip section, and assigns the numerical parameters of the channels corresponding to the selected n pieces of the level operation members to the respective knobs of the n pieces of the assignment channel strips in order to change the quantitative setting state of the numerical parameters of the channels corresponding to the n pieces of the level operation members.

In short, the display section may be provided with a position sensor, and when a detection is made for the operation of an on/off operation member displayed on the display section, with the channel of the on/off operation member, on/off setting and display state are inverted for the parameter corresponding to the on/off operation member. When a detection is made for the operation of any displayed level operation member, not only the channel of the level operation member but also the remaining pieces of level operation members corresponding to the remaining pieces of channels of the group currently assigned to the assignment channel strip section are all put into a selection state on display. The parameters of the channels corresponding to the n pieces of level operation members having been put into the selection state are each assigned to an assignment knob operation member of the assignment channel strips to enable a numerical value setting change of the parameters of the channels corresponding to the n pieces of level operation members.

In another preferred form, the group selection operation section includes a group selection operation member that corresponds to a group of output channels not carrying a corresponding channel strip section on the operation panel, and that is operated to assign n number of the output channels of the group to the n pieces of the assignment channel strips of the assignment channel strip section, and wherein the group selection operation member which issues a command of assigning the output channels not carrying the channel strip section to the n pieces of the assignment channel strips of the assignment channel strip section is arranged within the group selection operation section at a position which is associated to positions of the assignment channel strip section and the display section on the operation panel.

In short, a group selection operation member may be provided to issue a command to group output channels carrying no channel strip section on the operation panel, and to assign n pieces of output channels of the group to n pieces of assignment channel strips of the assignment channel strip section. Such a group selection operation member for issuing a command to assign any output channels carrying no channel strip section to n pieces of assignment channel strips of the assignment channel strip section is disposed plurally in the vertical direction within the group selection operation section at the position corresponding to the position of the assignment channel strip section and the display section within the operation panel, thereby indicating the positional relationship therebetween.

In another aspect of the invention, there is provided an audio mixing console having an operation panel for operating a mixer apparatus which inputs audio signals and outputs the audio signals after application of various types of signal processing to the audio signals. The inventive audio mixing console comprises: a plurality of channels that are provided for applying the various types of the signal processing to the audio signals, the channels being grouped into a multiple of groups each including n number of the channels where n is an integer of 2 or more; a current memory that stores a plurality of parameters for each of the channels for defining the signal processing applied by each channel; a display section provided on the operation panel; a plurality of channel selection operation members that are provided in correspondence to the plurality of the channels, and that are operated to select one of the plurality of the channels; a multiple of group selection operation members that are provided in correspondence to the multiple of the groups, and that are operated to select the corresponding groups of the channels; an assignment channel strip section that is disposed under the display section on the operation panel, and that includes n pieces of assignment channel strips arranged in a lateral direction, each assignment channel strip being provided with operation members for setting parameters of the channels; a parameter operation section that is disposed on a left side of the display section on the operation panel, and that is provided with a plurality of assignment knob operation members for setting the parameters of the selected channel; a group selection section that selects one of the groups when the corresponding group selection operation member is operated, and that assigns the n number of the channels of the selected group to the n piece of the assignment channel strips; a first display control section that displays on the display section a group screen that displays the setting state of the plurality of the parameters for the n number of the channels of the selected group in such a manner that the respective parameters of the channels assigned to the respective assignment channel strips are displayed at positions above the respective assignment channel strips; a first parameter control section that changes the setting of the parameters of the assigned channels of the selected group stored in the current memory when the operation members of the assignment channel strips are operated; a channel selection section that selects one of the channels when the corresponding channel selection operation member is operated, and assigns the plurality of the parameters of the selected channel to the plurality of the assignment knob operation members of the parameter operation section; a second display control section that displays a parameter screen on the display section in response to a predetermined screen switch command, the parameter screen containing graphic symbols of knob operation members arranged at positions corresponding to positions of the assignment knob operation members of the parameter operation section, and containing the setting state of the plurality of the parameters of the channel selected by the channel selection section using the graphic symbols of the knob operation members; and a second parameter control section that changes the settings of the parameters of the selected channel stored in the current memory when the assignment knob operation members are operated in the parameter operation section.

Preferably, when displaying the group screen, the first display control section presents a setting state of an on/off parameter for the channels of the selected group by displaying a graphic symbol of the on/off operation member, the display section is provided with a position sensor that can detect an operation position on the display section, and when the position sensor detects an operation position on the group screen, the first parameter control section operates in case that the graphic symbol of the on/off operation member is located at the detected operation position, for inverting the setting state of the on/off parameter and for changing a display mode of the graphic symbol of the on/off operation member.

Preferably, when displaying the parameter screen, the second display control section presents a setting state of an on/off parameter of an on/off operation member for the selected channel by displaying a graphic symbol of the on/off operation member, the display section is provided with a position sensor that can detect an operation position on the display section; and when the position sensor detects an operation position on the parameter screen, the second parameter control section operates in case that the graphic symbol of the on/off operation member is located at the detected operation position, for inverting the setting state of the on/off parameter for the currently selected channel and changing a display mode of the graphic symbol of the on/off operation member of the currently selected channel.

Preferably, the plurality of the channels include input channels in charge of signal processing for an input audio signal, output channels in charge of signal processing for an output audio signal, and/or internal channels in charge of internal signal processing.

Preferably, the assignment knob operation member provided in the parameter operation section has a function of generating a push operation event by pushing a knob portion of the assignment knob operation member, such that the group screen and the parameter screen is alternately switched to the other of the group screen and the parameter screen each time the push operation event is detected.

According to the present invention, the position of the group selection operation member is corresponding to the position of the channel strip section for each of the groups on the operation panel. This assists users in finding the group selection operation member of any desired group for operation. Moreover, by looking at the position of the group selection operation member that is turned on, it is easy to tell which group is currently selected. Using the display and the assignment channel strips enables to change the parameters of a plurality of channels of the group selected by the group selection operation member.

What is more, using a display including a position sensor exemplified by a touch panel enables to turn on/off the displayed on/off operation member, and parameter selection for assignment to the level operation member. The displayed level operation member cannot be changed in value through touch operation on the display, and thus there is no more fear to inadvertently touch the displayed level operation member.

Moreover, as to the group of output channels, it is easy to recognize that the panel carries thereon no assigned channel strip other than the assignment channel strips by looking at the disposition of the output group selection operation member.

According to this invention, by simply operating a group selection operation member and a channel selection operation member, a screen display change can be easily made between a group-basis group screen and a channel-basis parameter screen. Further, it can easily indicate which of the group screen and the parameter screen is displayed without a look at the screen details. This is achieved by checking whether the display screen is a screen of displaying a plurality of parameters for channels in such a display region as to continue upward from each assignment channel strip of the assignment channel strip section arranged under the display section, or displaying a plurality of knob operation members for the parameter operation section on the left hand side of the display section with exactly the same disposition. What is more, by the display including a position sensor such as a touch panel, the displayed on/off operation member can be turned on/off.

A knob operation member of the parameter operation section is provided with a function of generating a push operation event by pushing a knob portion thereof. If a screen change is made between the group screen and the parameter screen when the push operation event is detected as being generated, the screen change is realized with more ease. As an example, the function of a plurality of knob operation members in the parameter operation section may be checked by screen change from a group screen to a parameter screen, and right after that, the group screen is put back so as to operate the knob operation members of the parameter operation section with the group screen.

DETAILED DESCRIPTION OF THE INVENTION

Figure 1:
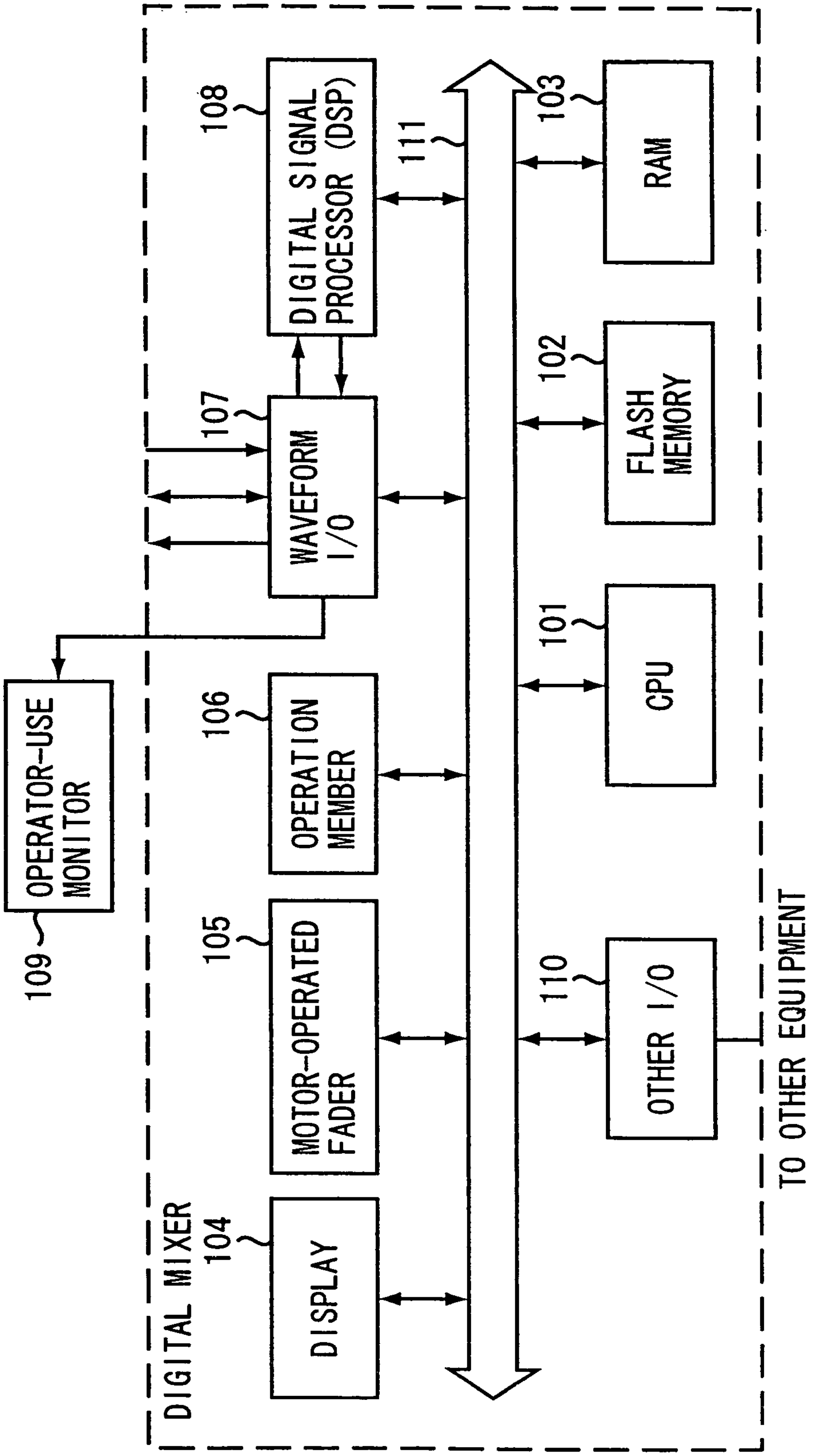
FIG. 1 is a block diagram showing the hardware configuration of a digital mixer in an embodiment applied with an audio mixing console of this invention.

In the below, an embodiment of this invention is described by referring to the accompanying drawings. FIG. 1 is a block diagram showing the hardware configuration of a digital mixer, as an embodiment, applied with an audio mixing console of this invention. This digital mixer is provided with a central processing unit (CPU) 101, flash memory 102, random access memory (RAM) 103, a display section 104, a motor-operated fader 105, operation members 106, a waveform input/output interface (I/O) 107, a digital signal processor (DSP) 108, an operator-use motor 109, other I/O 110, and a bus line 111.

The CPU 101 is a processing unit that exercise control over the mixer in its entirety. The flash memory 102 is nonvolatile memory storing various programs to be executed by the CPU 101, various data, and others. The RAM 103 is volatile memory for use for load regions and work regions of the programs to be executed by the CPU 101. The display 104 is a display provided on an operation panel of the mixer for displaying various types of information. The display 104 is a touch panel, and can input the position touched by a finger or others. The motor-operated fader 105 is an operation member provided on the operation panel for level setting. In response to a command coming from the CPU 101, the motor-operated fader 105 is set by the level setting value, and the knob position can be motor-driven to the position corresponding to the setting value. The operation member 106 is an operation member varying in type (not including the motor-operated fader) provided on the operation panel for user operation. The waveform I/O 107 is an interface for exchange of waveform signals with external equipment. The DSP 108 applies processes of mixing, effects application, volume level control, or others to the waveform signals received via the waveform I/O 107 by running various microprograms based on commands coming from the CPU 101, and outputs the resulting processed waveform signals via the waveform I/O 107. The operator-use monitor 109 displays an output to a monitor-use headphone to be used by a person who is in charge of operation (operator) of the mixer. The other I/O 110 is an interface for use for connection with other equipment.

Figure 2:
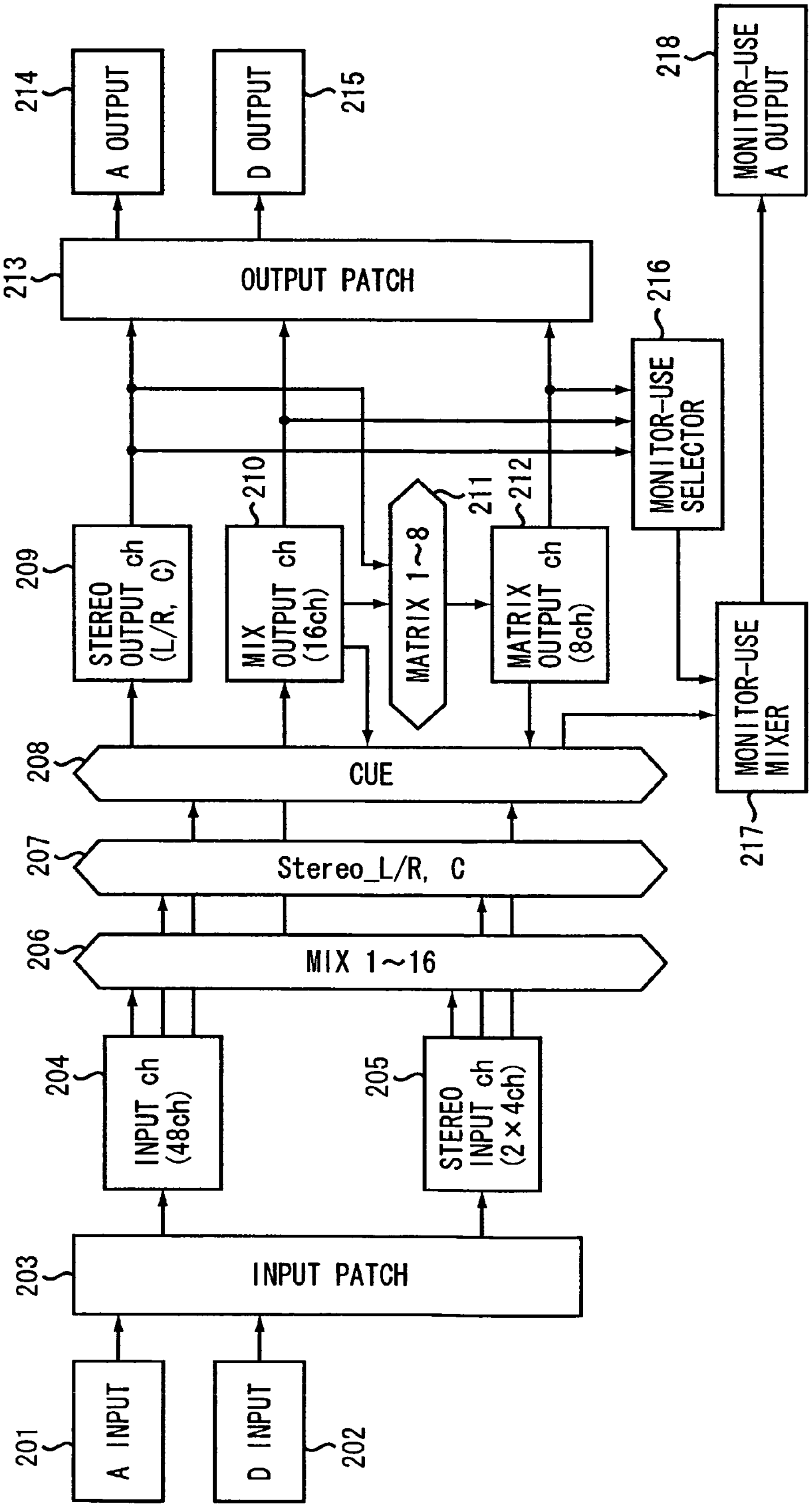
FIG. 2 is a block diagram showing the functional configuration of a digital mixer.

FIG. 2 is a block diagram showing the functional configuration of the digital mixer of FIG. 1. 201 denotes an input derived by converting an analog sound signal input by a microphone or others into a digital signal. 202 denotes an input of a digital sound signal. These inputs can be provided plurally (the number thereof has an upper limit depending on the device configuration). An input patch 203 arbitrarily establishes a connection from the above-described input lines to an input channel (channel) 204 or a stereo input channel 205. The connection setting can be arbitrarily done while users look at any predetermined screen. The input channel 204 is a single, including 48 channels. The stereo input channel 205 is configured by 4 sets (2 by 4 channels), and a left signal (L) and a right signal (R) of each of the sets are so configured as to be controlled in pairs.

Signals from each of the input channel 204 and the stereo input channel 205 can be selectively output to any arbitrary bus, i.e., 16 MIX buses 206, a stereo bus (Stereo_L/R, C) 207, and a CUE bus 208, and their send-out level can be individually set.

Each of 16 buses of the MIX bus 206 mixes signals coming from the input channel 204 and the stereo input channel 205. The resulting mixed signal is output to a MIX output channel 210 (1 to 16 channels) corresponding to the MIX bus. The MIX bus 206 has a one-to-one relationship with a MIX output channel 210 in terms of channel. The output of the MIX output channel 210 is provided to an output patch 213. The stereo bus 207 mixes signals coming from the input channel 204 and the stereo input channel 205. The resulting mixed stereo signal is output to a stereo output channel 209. Note here that the stereo bus 207 and the stereo output channel 209 are also provided with a C (center) signal line (C bus, C output channel) in addition to L (left) and R (right) signal lines (L bus, R bus, L output channel, and R output channel). For example, those are used in such a state that music or others are provided to LR in stereo, and are reproduced from right and left speakers, and speaker's voice is provided to C, and is reproduced from a speaker provided at the center. As to the stereo output channel 209, LR are controlled in pairs, and LR and C are controlled separately. The output of the stereo output channel 209 is provided to the output patch 213. A CUE bus 208 is a bus to check what signals are provided to the respective channels. When a CUE switch provided to the respective channels that will be described later is turned on, only the signal of the channel is provided to a monitor-use mixer 217 via this bus 208.

The output signal from the stereo output channel 209 is output to both the output patch 213 and a matrix bus 211. The output signal from the MIX output channel 210 is output to all the output patch 213, the matrix bus 211, and the CUE bus 208. The matrix bus 211 is a bus of 1 to 8 channels that selectively input and mix any arbitrary channel output of the stereo output channel 209 and the MIX output channel 210. The signal as a result of mixing by the matrix bus 211 is output to a matrix output channel 212. The matrix bus 211 has a one-to-one relationship with the matrix output channel 212 in terms of channel. The output of the matrix output channel 212 is provided to both the output patch 213 and the CUE bus 208. The output patch 213 arbitrarily establishes a connection from the above-described three output channels 209, 210, and 212 to an output line. The connection setting can be arbitrarily done while users look at any predetermined screen. An A output 214 denotes an analog output line, and a D output 215 denotes a digital output line.

A monitor-use selector 216 receives signals from the output channels 209, 210, and 212, and selectively outputs the output of any arbitrary channel instructed by the operator to the monitor-use mixer 217. The sound for listeners is generally provided to these output channels 209, 210, and 212, and thus by monitoring, using a headphone or others, the sound output from the monitor-use selector 216 to a monitor-use A output 218 via the monitor-use mixer 217, the operator checks the sound being provided to the hall. On the other hand, when any arbitrary channel provided to the CUE bus 208 is turned CUE-on by the CUE switch, the signal of the channel is output to the monitor-use A output 218 via the CUE bus 208 and the monitor-use mixer 217. At this time, the monitor-use mixer 217 reduces (or make zero) the level of the signal coming from the monitor-use selector 216, and mixes the signal with the signal coming from the CUE bus 208 for output to the monitor-use A output 218. In this manner, irrespective of the sound being provided to the hall, only the channel turned CUE-on can be mainly monitored.

Figure 3:
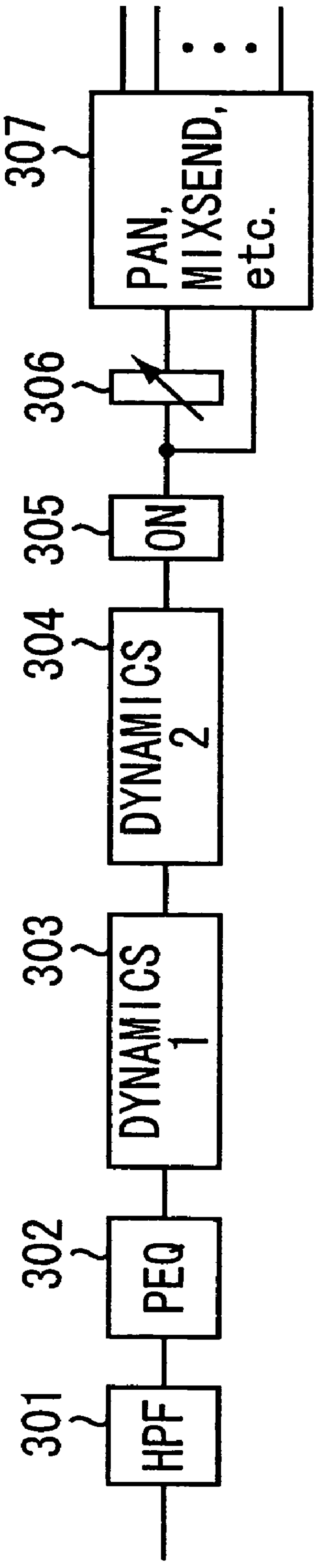
FIG. 3 is a diagram showing the schematic configuration of signal processing performed in a single channel.

FIG. 3 shows the schematic configuration of one of the input channels 204 of FIG. 2 in terms of signal processing. The input channel is provided with a high-pass filter (HPF) 301, a parametric equalizer (PEQ) 302, a first dynamics (DYNAMICS1) 303, a second dynamics (DYNAMICS2) 304, an ON switch (ON) 305, a fader 306, and a pan and combination level adjustment section 307.

The HPF 301 and the PEQ 302 are parts of serving the function of adjusting the frequency characteristics. The dynamics 303 and 304 are parts of both changing signal amplification, and are exemplified by a noise gate (gate for closing not to leave noise when the signal level is reduced), or a complexer (in charge of automatic gain adjustment). The ON 305 is a switch for turning on/off the signal output of the channel. The fader 306 is a volume for level adjustment. 307 is a part for exercising control over right and left localization (pan) for a case where signals are output in stereo to the stereo bus or any other buses, exercising control over on/off of signal output to the respective buses, and adjusting the respective levels (send-out levels) of the output signals for the respective buses. The stereo input channel 205 is similar in configuration to that of FIG. 3(*a*). However, with the stereo input channel 113, the left signal (L) and the right signal (R) of stereo are controlled in pairs. Moreover, the configurations of the stereo output channel 209, the MIX output channel 210, and the matrix output channel 212 are also similar (although the component function varies for signal processing).

Figure 4:
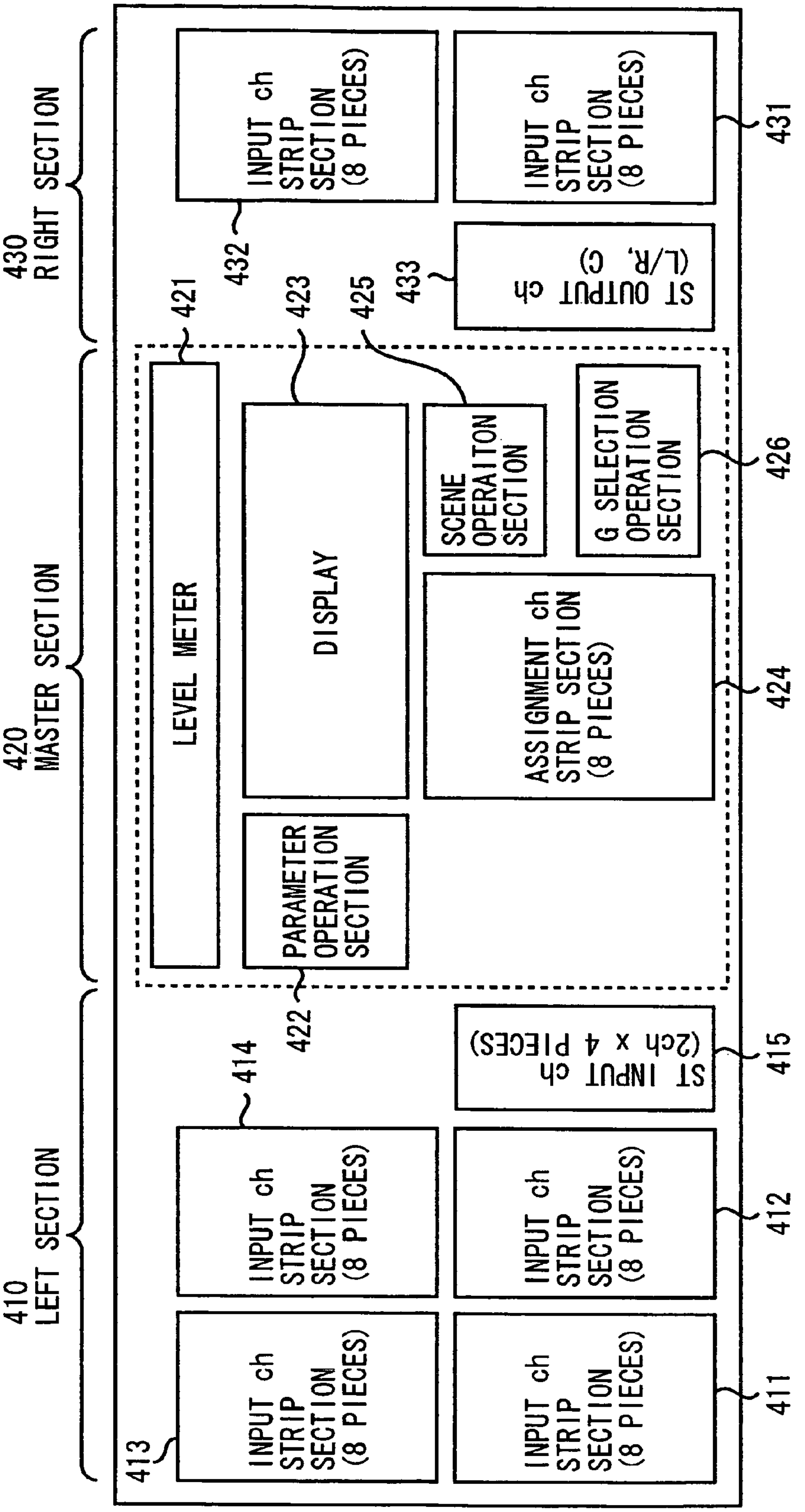
FIG. 4 is a diagram showing the arrangement of operation members on an operation panel in the mixer.

FIG. 4 shows the arrangement of various operation members on the operation panel of the mixer in this embodiment. From the operator side, a left section 410 is provided on the left side, a master section 420 is provided at the center, and a right section 430 is provided on the right side. The left section 410 is provided with input channel strip sections 411 to 414, and the right section 430 is provided with input channel strip sections 431 and 432. The input channel strip sections 411 to 414, 431 and 432 are each provided with operation members of 8 channels, i.e., in order, first to eighth channels, ninth to sixteenth channels, seventeenth to twenty-fourth channels, twenty-fifth to thirty-second channels, thirty-third to fortieth channels, and forty-first to forty-eighth channels, out of the input channel 204 of FIG. 2. An ST input channel strip section 415 is an operation member corresponding to the stereo input channel 205 of FIG. 2. An ST output channel strip section 433 of the right section 430 is an operation member corresponding to the stereo output channel 209 of FIG. 2. The master section 420 includes a level meter 421, a parameter operation section 422, a display 423, an assignment channel strip section 424, a scene operation section 425, and G (group) selection operation section 426.

Figure 5A:
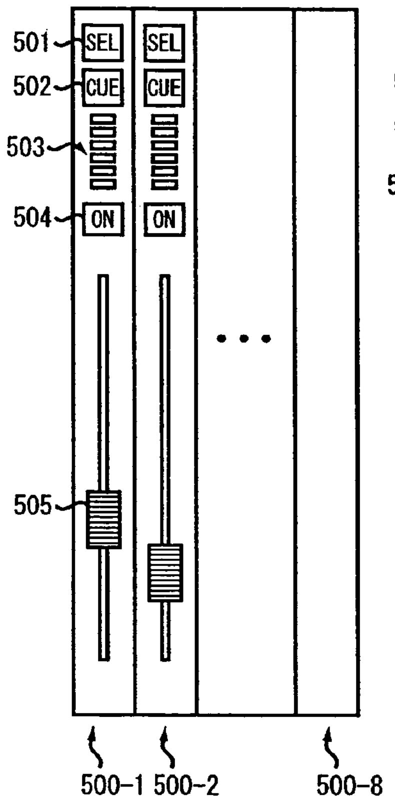
FIGS. 5(*a*), 5(*b*) and 5(*c*) are detailed configuration diagrams of a channel strip section.
Figure 5B:
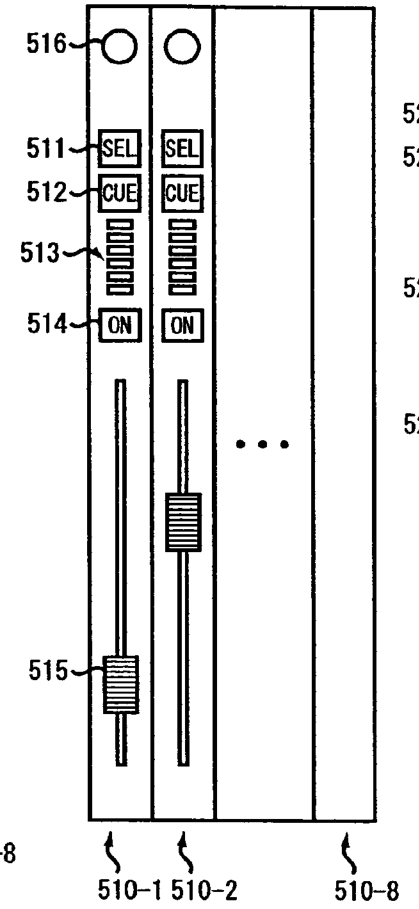
Figure 5C:
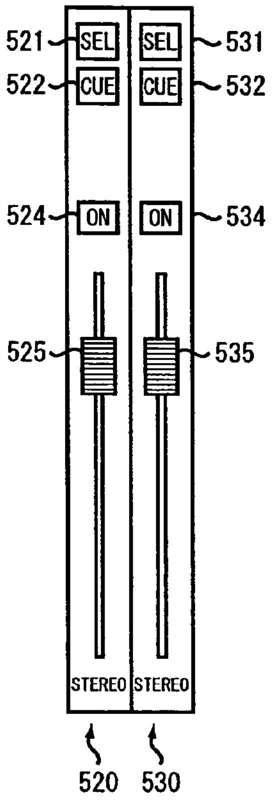

FIG. 5(*a*) shows the detailed configurations of the input channel strip sections 411 to 414, 431, and 432. These input channel strip sections each include 8 channel strips of 500-1 to 500-8. One channel strip, e.g., 500-1, includes an SEL switch 501, a CUE switch 502, an LED 503 for a level meter, an ON switch 504, and a motor-operated fader 505. The switches 501, 502, and 504 are each provided with an LED that comes on when each corresponding switches are turned on, and goes off when the switches are turned off. The SEL switch 501 is a switch of selecting the channel assigned to the channel strip, and selecting an option for making a detailed parameter setting to the channel on a parameter screen (FIG. 8), which will be described later. The CUE switch 502 is a switch of changing on/off of the signal output coming from the channel to the CUE bus 208, which is described by referring to FIG. 2. The LED 503 is a meter that displays, in real time, the level value of signal to be provided to the channel. The ON switch 504 is a switch of changing on/off of the signal of the respective channels, and is corresponding to the ON 305 of FIG. 3. The motor-operated fader 505 is an operation member for level setting to the channel, and generally is corresponding to the fader 306 of FIG. 3, serving for send-out level control in 307 of FIG. 3 in a send mode. In response to a command coming from the CPU 101, the position of the knob of the motor-operated fader 505 can be set to any predetermined position. Other channel strips 500-2 to 500-8 have the similar configuration. The ST input channel strip section 415 is also having the similar configuration. Note herein that as to the ST input channel strip section 415, one channel strip is corresponding to a pair of right and left stereo input channels, and there are four sets of such stereo input channels. Therefore, four channel strips are provided for the four sets.

FIG. 5(*b*) shows the detailed configuration of the assignment channel strip section 424 of FIG. 4. Eight channel strips 510-1 to 510-8 are provided, and the configuration of a channel strip is similar to that of the channel strip 500-1 described by referring to FIG. 5(*a*). The components of 511 to 515 are corresponding to the components of 501 to 505, respectively. 516 is a rotary encoder that is provided only to the assignment channel strip section. The rotary encoder 516 provided to each of the channel strips 510-1 to 510-8 serves to change the parameters corresponding to the display components that are in the state of being selected on a group screen (that will be described later in detail by referring to FIG. 7) displayed on the display 423. These rotary encoders 516 each serve to generate a push operation event when it is depressed (the assignment knob operation member of claim 1).

FIG. 5(*c*) shows the detailed configuration of the ST output channel strip section 433 of FIG. 4. 520 denotes a channel strip for operating a stereo output channel (L/R pair), and 530 denotes a channel strip for operating a monophonic output (C). The channel strips 520 and 530 have the configuration similar to that of the channel strip 500-1, which is described by referring to FIG. 5(*a*). The components of 521 to 525, and 531 to 535 are corresponding to the components of 501 to 505, respectively.

Figure 6A:
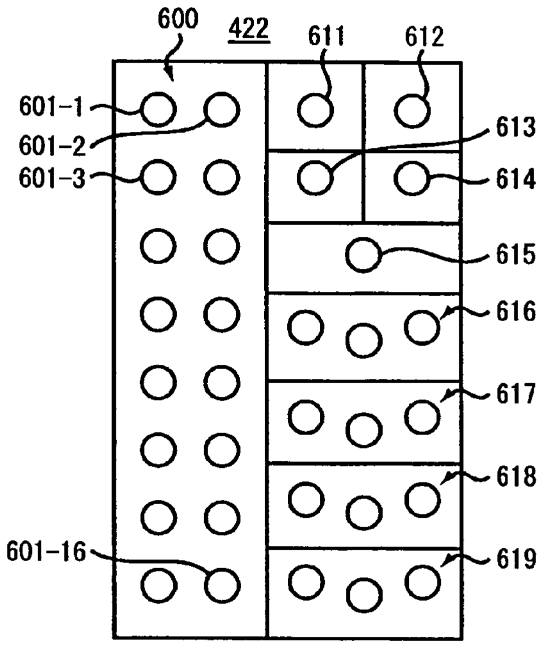
FIGS. 6(*a*), 6(*b*) and 6(*c*) are detailed configuration diagrams of a parameter operation section and others.
Figure 6B:
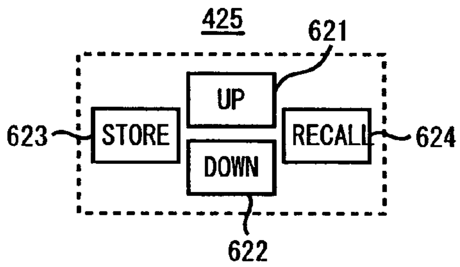
Figure 6C:
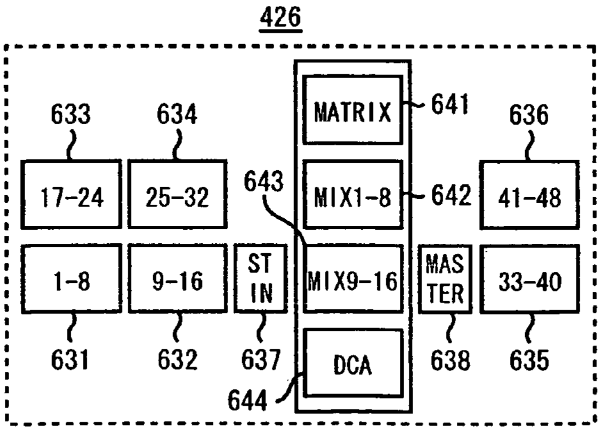

FIG. 6(*a*) shows the detailed configuration of a parameter operation section 422 of FIG. 4. The parameter operation section 422 includes a plurality of operation members for exercising control, in parallel, over a plurality of parameters for the user-selected channel among the input channel 204, the stereo input channel 205, the stereo output channel 209, the MIX output channel 210, and the matrix output channel

212, each of these is provided plurally. Herein, information about the currently-selected channel is always displayed on a selected channel display region (740 of FIGS. 7 and 8) in the screen displayed on the display 423. Numeral 600 denotes a rotary encoder region, and includes 16 rotary encoders 601-1 to 601-16. 611 to 615 are rotary encoders for use of setting various parameters for the designated channel. The regions of 616 to 619 are each provided with three rotary encoders, which are for equalizer adjustment for the designated channel. These rotary encoders all serve to generate a push operation event when they are depressed.

FIG. 6(*b*) shows the detailed configuration of the scene operation section 425 of FIG. 4. The scene operation section 425 includes an up switch 621, a down switch 622, a store switch 623, and a recall switch 624. The scene means a combination of parameters that define the setting state of the mixer. The present mixer is provided with current memory, and various parameter values are stored in the current memory. The mixer operates based on the setting made to the parameter values on the current memory. Out of the parameter values on the current memory, the parameter values of the input patch, input channel, output channel, and output patch are allowed to be kept (stored) in scene memory with scene numbers assigned. On the other hand, any scene can be reproduced with ease by calling up (recalling) it from the scene memory to the current memory by specifying any scene number.

FIG. 6(*c*) shows the detailed configuration of the G (group) selection operation section 426 of FIG. 4. Six selection switches 631 to 636 are operation members being corresponding to the input channel strip sections 411 to 414, 431, and 432 of FIG. 4, respectively, and assigning (recalling) these input channel strip sections to the assignment channel strip section 424. When the selection switch 631 is turned on, for example, the input channel strip section 411 is assigned to the assignment channel strip section 424, whereby the eight assignment channel strips 510-1 to 8 shown in FIG. 5(*b*) are allowed to serve as the input channel strips for the first to eighth channels. In a similar manner, the input channel strip sections 411 to 416 are assigned to the assignment channel strip section 424 in the master section 420 at the center, e.g., the ninth to sixteenth channels of the input channels are assigned as such when the selection switch 632 is turned on, or the seventeenth to twenty-fourth channels of the input channels are assigned as such when the selection switch 633 is turned on. Similarly, when an STIN switch 637 of the G selection operation section 426 is turned on, the ST input channel strip section 415 of FIG. 4 is assigned to the assignment channel strip section 424, and when the master switch 638 is turned on, the ST output channel strip section 433 of FIG. 4 is assigned thereto. Note here that the ST input channel strip section 415 is configured by four channel strips, and the ST output channel strip section 433 is configured by two channel strips. When assignment is made to the assignment channel strip section 424, four or two channel strips on the left side are only activated, respectively.

As described above, without operating the channel strip sections located in the left and right sections 410 and 430, the operator can perform operation by recalling the channel strip sections to the assignment channel strip section 424 in the master section 420 at the center portion, thereby allowing the operator to perform operation without moving right and left in front of the operation console. Herein, it is surely effective to operate using the channel strips of the channel strip sections 411 to 415, and 431 to 433. The channel strips of the assignment channel strip section 424 are correlated in movement with the channel strips of the channel strip section that is originally assigned thereto. For example, when one of the channel strips is used for switch or fader operation, the operation will be reflected to the corresponding channel strip.

Especially, the disposition of the selection switches 631 to 638 in the G selection operation section 426 is corresponding to the disposition on the operation panel shown in FIG. 4, i.e., the input channel strip sections 411 to 415, 431, and 432, the ST input channel strip section 415, and the ST output channel 433. Therefore, the operator can intuitively operate the selection switches in the G selection operation section 426 without looking at his or her hands, and assign any desired channel strip section to the assignment channel strip section 424. As such, any desired channel strip section can be assigned to the assignment channel strip section 424 so that the operator can perform operation only using the center section 420 without extending his or her hands to the left and right sections 410 and 430.

The above-described selection switches 631 to 638 are switches for assigning the channel strip section provided on the operation panel of FIG. 4 to the assignment channel strip section 424. On the other hand, 641 to 644 are assignment switches for operating any internal channel not found on the operation panel. 641 is a selection switch for specifying to use the assignment channel strip section 424 as an operation member for operating the channels of the matrix output channel 212 (8 channels) of FIG. 2. 642 is a selection switch for specifying to use the assignment channel strip section 424 as an operation member for operating the first to eighth channels of the MIX output channel 210 of FIG. 2, and 643 is a selection switch therefor for operating the ninth to sixteenth channels of the MIX output channel 210. 644 is a selection switch for specifying to use the assignment channel strip section 424 as an operation member for operating the channels when a DCA function that is not shown is used.

These selection switches 631 to 638, and 641 to 644 of the G selection operation section 426 are each selectively turned on, and including an LED that comes on when turned on to indicate which selection switch is currently selected. When the selection switch that has been turned off is turned on again, the switch is accordingly comes on, and the switch(es) that have been turned on are to be turned off. Note here that a set of a plurality of channels that can make a recall to the assignment channel strip section 424 by the selection switches 631 to 638, and 641 to 644 is referred to as group.

Figure 7:
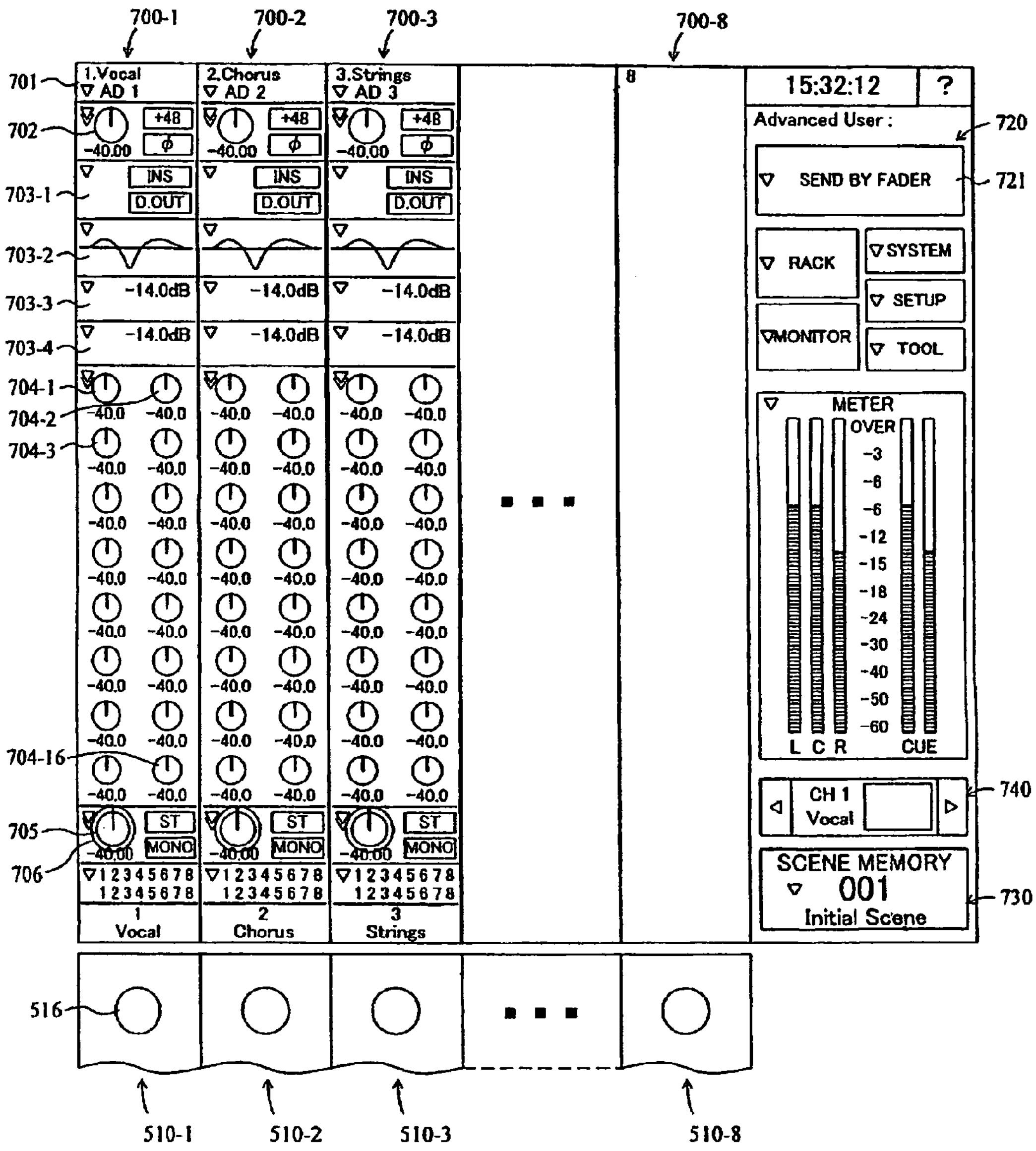
FIG. 7 is a diagram showing exemplary display of a group screen.

FIG. 7 shows exemplary display of a group screen displayed on the display section 423 of FIG. 4. The group screen is a screen that displays the setting state of the respective channels of the group selected by the selection switches 631 to 638, and 641 to 644 of the G selection operation section 426 that is described by referring to FIG. 6(*c*). When any of the selection switches is turned on, any corresponding group screen is displayed. Moreover, a function is provided to display the group screen depending on a push operation event of the rotary encoder, and the function will be described later. FIG. 7 shows exemplary display state of the display section 423 when the selection switch 631 is turned on, and when the input channel strip section 411 is assigned to the assignment channel strip section 424. 700-1 to 700-8 are regions for displaying the parameter setting state of the respective channels (first to eighth input channels in this example) of the selected group. The display regions 700-1 to 700-8 are so displayed as to correspond, in the vertical direction, to the channel strips 510-1 to 510-8 of the assignment channel strip section 424 provided on the lower side of the display section 423.

In a display region for 1 channel, e.g., in 700-1, 701 is a region of displaying a channel number of the channel, a name of the channel, and an input system for input to the channel. 702 is a region of displaying a knob indicating the setting value of analog gain of a head amplifier (located inside of the A input of FIG. 2) connected to the input channel using an input patch, and the value thereof. 703-1 to 703-4 are regions indicating the setting state for various signal processing for the input channel. The knob 702 is a graphic symbol looking like a knob of the rotary encoder (a kind of level operation member), and is displayed as if being rotated by the amount or quantity corresponding to the numerical setting value. The setting state for signal processing in the regions 703-1 to 703-4 indicate, in order, the parameter setting state of the HPF 301, the PEQ 302, and the first and second DYNAMICS 303 and 304 for the channel, which is described by referring to FIG. 3. The boxes indicated as INS and D.OUT on the right side of the region 703-1 indicate an INS button and a D.OUT button, respectively. These buttons can be turned on and off by being touched (touched by a finger or others). The INS button is a button for an effective/ineffective setting about insertion of an internal effector that is not shown in FIG. 2 into the input channel, and the D.OUT button is a button for an effective/ineffective setting of direct output of a signal from the input channel to the output patch 213 of FIG. 2. The background portions of the regions 703-1 to 703-4 serve as buttons to turn on/off the function. For example, by touching the background portion of the region 703-1 by a finger or others, the HPF 301 of the channel can be turned on/off. Turning off the HPF 301 means to make the HPF 301 ineffective to make the signal through.

704-1 to 704-16 are knob displays each indicating the setting value of the send-out level of the signal for output from the input channel to 16 MIX buses (206 of FIG. 2) (knob 704-n is corresponding to MIXn (nth MIX bus)). 705 is a knob display indicating the setting value of right and left localization (pan/Panning) when signals are output from the input channel to the stereo bus (207 of FIG. 2) or others in stereo. The signal processing relating to the send-out level and pan is taken charge by 307 of FIG. 3. The boxes indicated as ST and MONO on the right side of the knob 705 are indicating an ST button and a MONO button, respectively. By turning on/off these buttons by touching thereon, the signals to be output from the input channel to R and L buses of the stereo bus 207 can be turned on/off (ST button), or the signals to be output to the C bus can be turned on/off (MONO button).

For convenience of description, the display components in the display regions 700-2 to 700-8 are also assigned with numbers provided to the display components in the display region 700-1. For example, for an expression of a knob 704-1 in the display region 700-2, it means a knob of the display region 700-2 overlaid on a knob 704-1 of the display region 700-1 when the display region 700-2 is overlaid on the display region 700-1. This is applicable to the channel strips described by referring to FIG. 5.

When any of the knobs 702, 704-1 to 704-16, and 705 is touched, the touched knob is put into the selection state. To the knob in the selection state, a cursor 706 is set. The cursor 706 is in the shape of a ring overlaid on the knob display. Especially, no matter which knob of the channels is touched in the display regions 700-1 to 700-8 of the channels, the knob at the same position in the display regions 700-1 to 700-8 for the respective channels is selected in parallel at the same time. For example, when the knob 704-3 is touched in the display region 700-2, eight knobs 704-3 in the display regions 700-1 to 700-8 are all put into the selection state. Using the rotary encoder 516 for each of the assignment channel strips 510-1 to 510-8, the parameter values corresponding to the knobs put into the selection state in parallel can be individually changed. With the above-described parameter operation section 422, by paying attention to the selected one channel, a plurality of parameters for the channel can be operated in parallel. With the rotary encoder 516, on the other hand, by paying attention to one parameter selected by a touch (e.g., send-out level to any one of the MIX buses 206), the parameters for the 8 channels assigned to the assignment channel strips 510-1 to 510-8 can be operated in parallel. In this manner, with the send-out level, for example, the balance adjustment can be performed with ease in two views of the channel side and the parameter side, e.g., parallel operation from the attention-paid input channel in terms of the send-out level to a plurality of MIX buses, and parallel operation from the eight input channels in terms of the send-out level to one attention-paid MIX bus.

The inverted triangle mark or two-ply inverted triangle mark displayed in partial regions of the display regions 700-1 to 700-8 each serve as a button that issues a command to display a detailed parameter window for the functions for the partial regions. For example, when the inverted triangle mark in the partial region 703-1 displaying the setting state for the HPF 301 of the input channel is touched, a detailed parameter window for a detailed parameter setting for the HPF 301 is displayed over the display of FIG. 7. At this time, the rotary encoders 516 of the assignment channel strips 510-1 to 510-8 each serve as an operation member that changes the parameter value using the detailed parameter window. Note here that instead of acknowledging as a button only the inverted triangle and therearound, it is considered convenient to acknowledge as the triangle-mark button being operated no matter which background portion is touched in the partial region including the triangle mark therein.

When any knob is in the selection state in the display regions 700-1 to 700-8, if any button is touched, the function corresponding to the button operation is activated, but the knob remains in the selection state. Alternatively, when any knob is touched, not only by putting eight knobs located at the same position as the knob into the selection state, at the same time, any channel assigned to the assignment channel strip including the touched knob may be selected as the channel to be controlled by the parameter control section 422. Still alternatively, the function of selecting, in a correlated manner, the to-be-controlled channel may be made effective/ineffective if the user requests.

720 denotes a display region for buttons to be used for various settings for the mixer, a meter indicating the output signal level of L/R and C of the stereo output channel, and others. Numeral 721 denotes a button for changing the operation mode of the motor-operated fader 105 of FIG. 1 (correspond to 505, 515, 525, and 535 of FIG. 5). When the button 721 is being turned off, the mode is in "general mode", and the motor-operated fader of the channel strips serve as a fader for controlling the signal level of the corresponding channel to control the signal level (gain) at the position of the fader 306 of FIG. 3. When the button 721 is being turned on, the mode is in "send mode", and the motor-operated fader of the channel strips serve as a fader for controlling the send-out level from the corresponding channel to control the send-out level (gain) at 307 of FIG. 3 for the selected bus. In the "send mode", the display region for the meter (METER) of the region 720 displays a button for selecting a single (or pair) bus from 16 MIX buses and stereo bus. Such button operation can select any bus as a target for controlling the send-out level of the motor-operated fader. 730 is a scene display that is currently recalled. The number of scenes is increased or decreased using an UP switch 621 and a DOWN switch 622 of the scene operation section 425 (FIG. 6(*b*)) located at the lower side of the display 730, and using a RECALL switch 624 and STORE switch 623, any scene can be recalled or stored. 740 is display of a channel that is currently selected, and in this example, an input channel "CH1" named as "Vocal" is selected. This channel selection can be performed using an SEL switch of the channel strip that will be described later, or using buttons provided right and left of 740 also will do.

In FIG. 7, exemplified is the group screen for the first to eighth input channels, which are displayed when the selection switch 631 is turned on. The group screens to be displayed when other selection switches 632 to 638, and 641 to 644 are turned on have the similar configuration. Note here that when the selection switch 637 is turned on, a display is made to cover four channels on the left side (700-1 to 700-4), and when the selection switch 638 is turned on, a display is made to cover two channels on the left side (700-1 to 700-2). When the selection switches 638, and 641 to 644 are turned on, the output-side channel will be displayed. However, these channels are partially different in terms of signal processing details from the input channels described by referring to FIG. 3 so that displays of the partial regions 701 to 706 in the display region for a single channel in the group screen are different from that of FIG. 7. For example, there is no display corresponding to the head amplifier of 702 because the input source of such channel signals is a bus, and there is also no display of the INS button 703-1, the knob 705, the ST button, the MONO button, or others. As to the knob for controlling the send-out level, only for the stereo output channel and the MIX output channel, eight knobs 704-1 to 704-8 corresponding to eight matrix buses 211 serving as a signal output destination are displayed.

Figure 8:
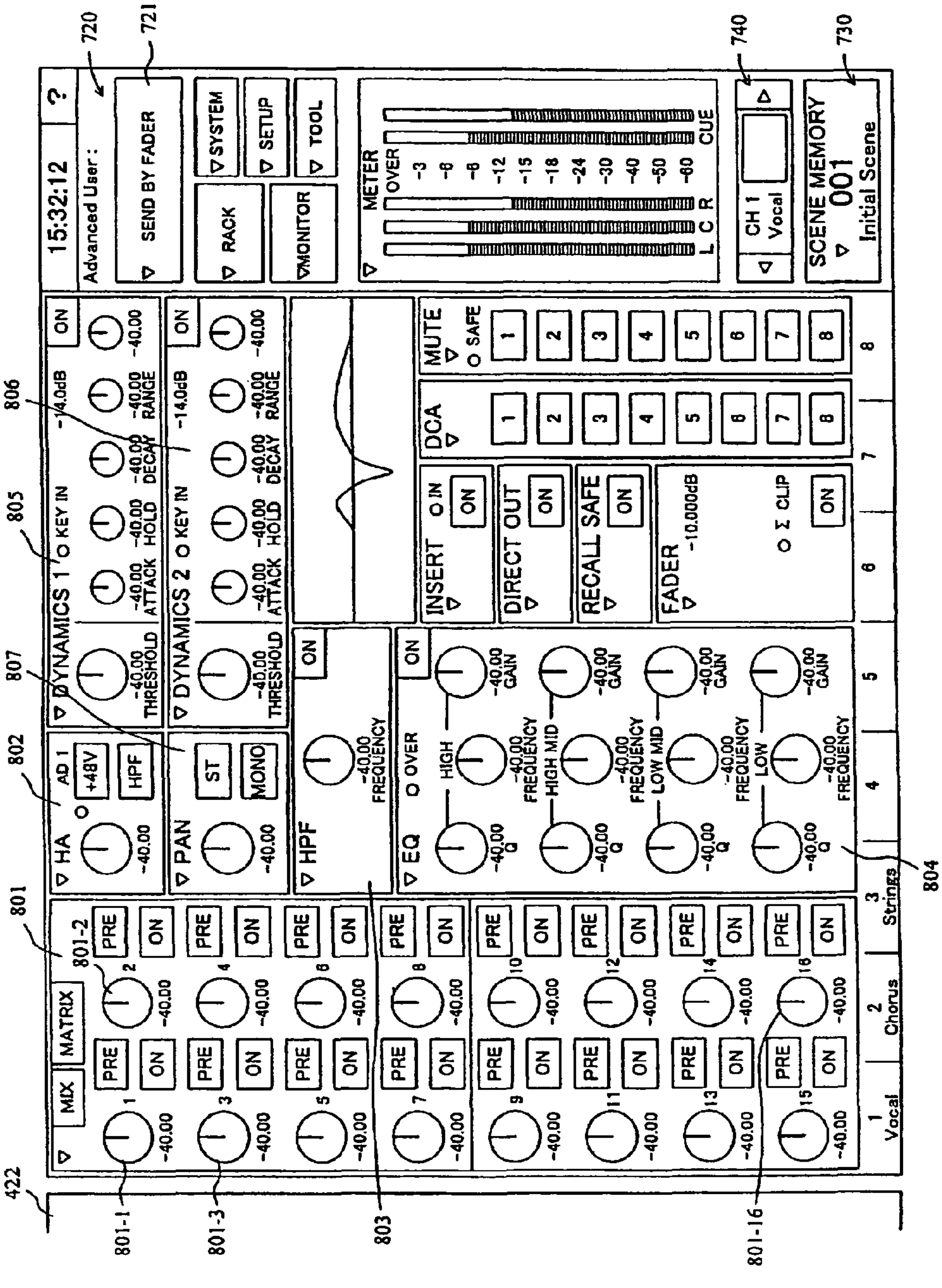
FIG. 8 is a diagram showing exemplary display of a parameter screen.
Figure 9A:
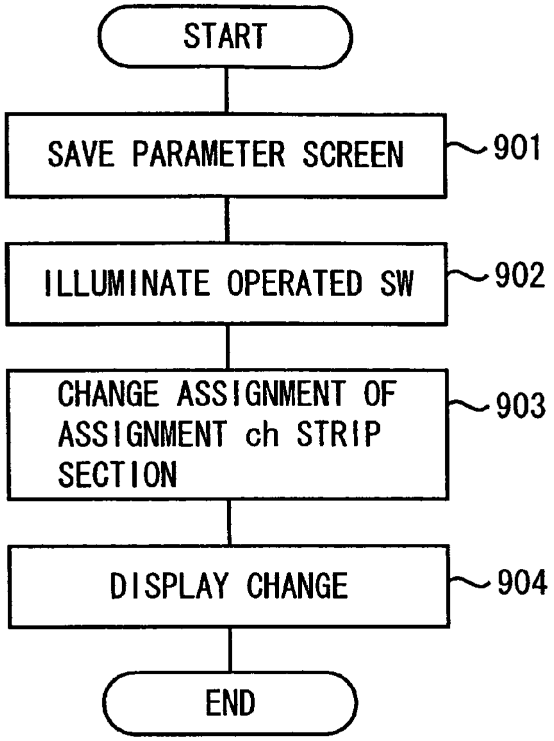
FIGS. 9(*a*), 9(*b*), 9(*c*) and 9(*d*) are flowchart diagrams showing an operation event routine for a group selection switch.
Figure 9B:
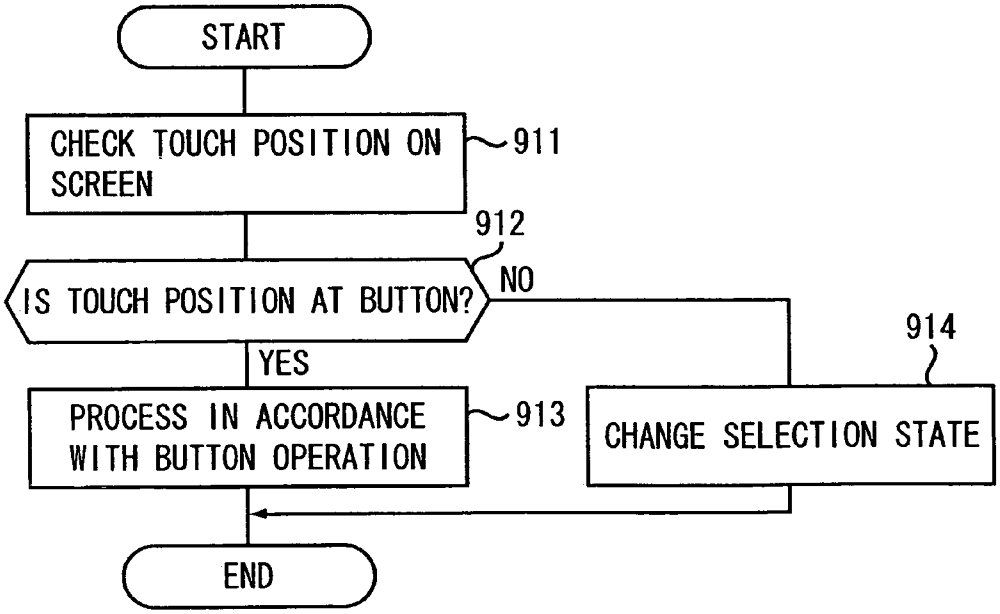
Figure 9C:
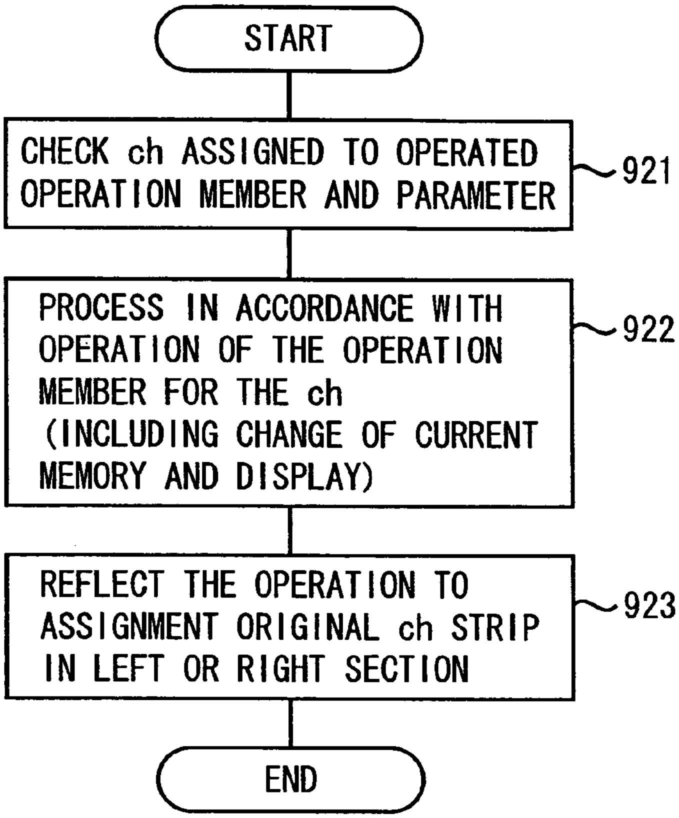
Figure 9D:
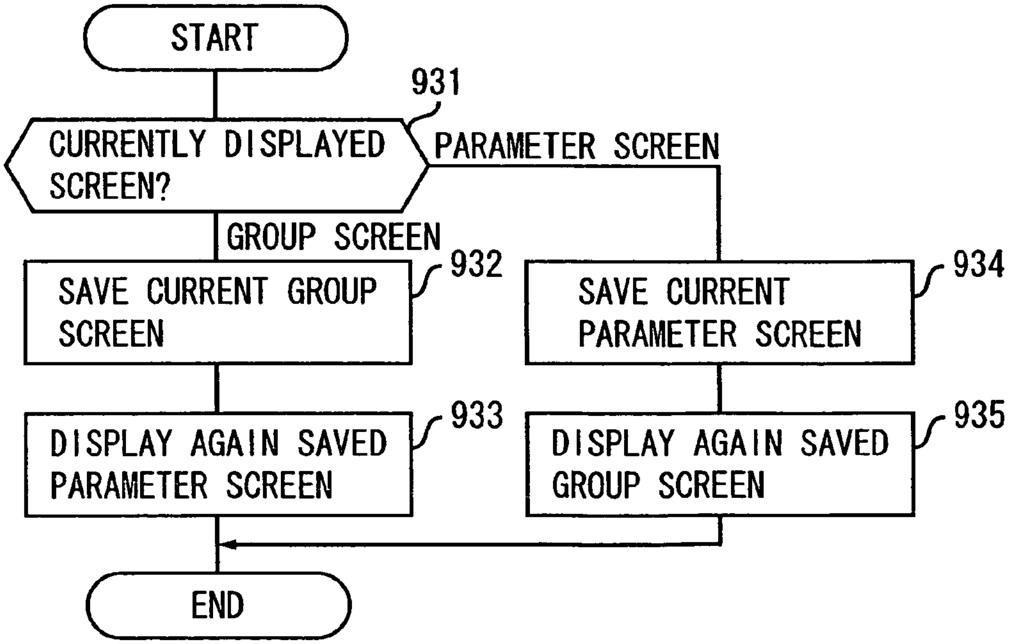

FIG. 8 shows exemplary display of a parameter screen that is to be displayed on the display 423 of FIG. 4. When an SEL switch (501, 511, 521, 531 or others of FIG. 5) is turned on for any of the channel strips in FIG. 4, i.e., the input channel strip sections 411 to 416, the stereo input channel strip section 417, the stereo output channel strip section 418, and the assignment channel strip section 424, the channel corresponding to the channel strip is selected as a target channel for the parameter operation in the parameter operation section 422. At this time, as a screen for displaying the detailed parameter setting state for the selected channel, this parameter screen is displayed. There is a function of displaying the parameter screen depending on the push operation event of the rotary encoder, and this function will be described later. The parameter screen of FIG. 8 displays a parameter screen for the first channel out of the input channels. Note here that exemplified here is the case of making a screen change to the parameter screen in response to the operation of the SEL switch, and there is also an option for users to set whether to activate/inactivate the function of changing into the parameter screen (channel selection is performed as an operation target).

801 is a display region for 16 knobs 801-1 to 801-16, indicating the send-out level from the input channel to 16 MIX buses 206. The knobs each carry on its right side a PRE button and an ON button. 802 is a knob display region indicating the gain level of the head amplifier provided in the stage preceding to the input channel. 803 to 806 are partial regions for displaying the parameter setting state for the input channel described by referring to FIG. 3, i.e., the HPF 301, the PEQ 302, and the first and second DYNAMICS 303 and 304. The partial regions 803 to 806 display any required number of knobs. 807 is a knob display region indicating the setting value of output signal pan (panning) from the input channel to the stereo bus (207 of FIG. 2). Other than that, if required, any partial regions are displayed for displaying the parameter setting state for the channel. Display of 720, 730, and 740 on the right side is similar to the group screen of FIG. 7.

The disposition of the knobs displayed in the partial regions 801 to 807 (note that the partial regions 805 and 806 display only knobs for THRESHOLD adjustment on the left side) is corresponding to the disposition of the rotary encoders in the parameter operation section 422 on the left side of the display 423, which is described by referring to FIG. 6(*a*). By operating the rotary encoders of the parameter operation section 422, the parameter value of any corresponding knob cab be changed. As such, the correspondence between dispositions eases operation.

In the parameter screen, buttons are provided in the partial regions if required. For example, the boxes indicated as ST and MONO in the region 807 indicate an ST button and a MONO button, respectively. When the ST button is partially touched, signal output from the input channel to the L and R buses of the stereo bus 207 can be turned on/off. When the MONO button is touched, signal output to the C bus can be turned on/off. The inverted triangle mark displayed in the partial regions 801 to 807 is, similarly to the group screen of FIG. 7, a button for issuing a command of displaying a detailed parameter window relating to the functions for the partial regions.

Exemplified in FIG. 8 is the parameter screen for the first input channel, but a parameter screen for any other channels is similar in configuration. However, depending on the channel configuration, the partial regions 801 to 807 may be different in display from FIG. 8.

Here, described is screen change using a push operation event of the rotary encoders of the assignment channel strip section 424 and the parameter operation section 422. When any of the rotary encoders is depressed, if a group screen is currently displayed, the screen will be changed to the parameter screen (the one saved) that is displayed lastly, and if a parameter screen is currently displayed, the screen will be changed to the group screen (the one saved) that is displayed lastly. In this manner, screen change can be easily made with hands on the rotary encoder. For example, although operation is generally made on a group screen, if a predetermined parameter of any specific channel is to be checked or corrected, utilizing a screen change function in response to a push operation event of a rotary encoder is convenient. Even if the screen is changed, it does not mean that the operation member of the assignment channel strip section 424 and that of the parameter operation section 422 are changed in function. Therefore, on a parameter screen, after pushing the rotary encoder of the parameter operation section 422 to check which parameter is changeable by the rotary encoder, the rotary encoder may be pushed again to have a group screen. Even with this being the case, using the rotary encoder can make fine adjustments of any corresponding parameters.

Both the group screen of FIG. 7 and the parameter screen of FIG. 8 are available for button on/off operation and knob selection by touching buttons or knobs on the screens. However, the parameter value indicated by the knob cannot be changed by the operation of screen touch, and using the rotary encoder provided on the panel will do. Accordingly, the parameter value of the knob is not changed by erroneous screen touch. Note here that with the operations made to the group screen and the parameter screen, and the operations made to the operation members of the operation sections, the value of any corresponding parameter stored in the current memory is changed, and as a result thereby, the changed binary parameter value is reflected to the on/off state of the buttons.

For the purpose of clarifying the correspondence between the parameter operation section 422 and the parameter screen, and the correspondence between the assignment channel strip section 424 and the group screen, the background color of the parameter operation section 422 may be of the same first color as the background color of the parameter screen, and the background color of the assignment channel strip section 424 may be of the same second color as the background color of the group screen, being different from the first color. With this being the case, it becomes easy to tell at a glance that the currently displayed screen is the group screen or the parameter screen, thereby leading to easy understanding which to operate either the parameter operation section or the assignment channel strip section. Alternatively, the knob color of the rotary encoder may be corresponded to the knob display on the screen.

FIG. 9(*a*) shows an operation event routine for the G selection switch. This process is activated when any of the selection switches 631 to 638, and 641 to 644 in the G selection operation section 426 of FIG. 6(*c*) is turned on. In step 901, the currently displayed parameter screen is saved to a parameter screen save region. If the currently displayed is a group screen, no process is executed. In step 902, the turned-on selection switch is illuminated. Note here that if there is any other selection switch that has been illuminated, the switch is turned off. In step 903, in accordance with the turned-on selection switch, channel assignment to the assignment channel strip section 424 is changed. In step 904, the screen to be displayed on the display 423 is changed to the group screen (FIG. 7) of the group corresponding to the turned-on selection switch, and the procedure is ended.

FIG. 9(*b*) shows an operation event routine for a group screen. When the group screen described by referring to FIG. 7 is displayed, the process is activated when any arbitrary position on the screen is touched. In step 911, the touch position on the screen is checked. In step 912, when the touch position is at a button (graphic symbol of an of/off operation member), the process in accordance with the button operation is executed in step 913 (on/off of parameter corresponding to the button, display of detailed parameter window for the region). When the position is at a knob (graphical symbol of a level operation member), the selection state (selection of eight knobs located at the same positions as the channel strips, and channel selection thereafter) is changed in step 914, and the procedure is ended. Changing the selection state is a process of changing the knob selection state as described by referring to FIG. 7. In the process in response to the button operation in step 913, as described by referring to FIG. 7, when the operated button is the inverted triangle mark or the two-ply inverted triangle mark, any corresponding detailed parameter window is opened. When the button is any other buttons, the process corresponding to the button operation is executed.

Namely, when displaying the setting state of the plurality of the parameters of the n member of the channels on the display section, the group selection section graphically presents on the display section an on/off operation member which represents a binary setting state of a binary parameter and a level operation member which represents a quantitative setting state of a numerical parameter, the display section is provided with a position sensor that can detect an operation position on the display section, and when the position sensor detects an operation position, the parameter control section operates in case that the on/off operation member is located at the detected operation position, for inverting the binary setting state of the binary parameter corresponding to the on/off operation member, and for inverting a display mode of the on/off operation member.

Further, when the position sensor detects an operation position, the parameter control section operates in case that the level operation member is located at the detected operation position, for selecting n pieces of the level operation members corresponding not only to the channels of the operated level operation member but also to the remaining channels of the channel strip section currently assigned to the assignment channel strip section, and assigns the numerical parameters of the channels corresponding to the selected n pieces of the level operation members to the respective knobs of the n pieces of the assignment channel strips in order to change the quantitative setting state of the numerical parameters of the channels corresponding to the n pieces of the level operation members.

FIG. 9(*c*) shows an operation event routine of an operation member of the assignment channel strip section 424. This process is activated when any of the operation members 511 to 516 in the channel strips 510-1 to 8 in the assignment channel strip section described by referring to FIG. 5(*b*) is operated (except a push operation event for the rotary encoder). In step 921, the channel and the parameter assigned to the operated operation member are checked. As to the operation members 511 to 514, their corresponding parameters are fixed, but when the operation member 515 is operated, any corresponding parameter is specified based on the operation mode of the motor-operated fader. When the operation member 516 is operated, any parameter corresponding to any knob being currently under the selection state on the group screen is specified. Even if the currently displayed is a parameter screen, when the group screen save region is saving the group screen, any knob being in the selection state on the group screen in the save region is checked, and a parameter to be changed is to be specified. In step 922, for the channel, the process corresponding to the operation of the operation member is to be executed. This includes a process of changing the parameter value corresponding to the operation member on the current memory, and if the screen display is required to be changed, a process of changing it. In step 923, the operation is reflected to the channel strip being the assignment source in the left or right section, and the procedure is ended.

FIG. 9(*d*) shows a routine that is to be activated when there is any push operation event for any of the rotary encoders of the assignment channel strip section 424 and the parameter operation section 422. When the currently displayed is a group screen in step 931, the current group screen is saved into the group screen save region in step 932, and the parameter screen that has been saved into the parameter screen save region is displayed again in step 933, and the procedure is ended. When the currently displayed is a parameter screen, the current parameter screen is saved into the parameter screen save region in step 934, and the group screen that has been saved in the group screen save region is displayed again in step 935, and the procedure is ended.

Figure 10A:
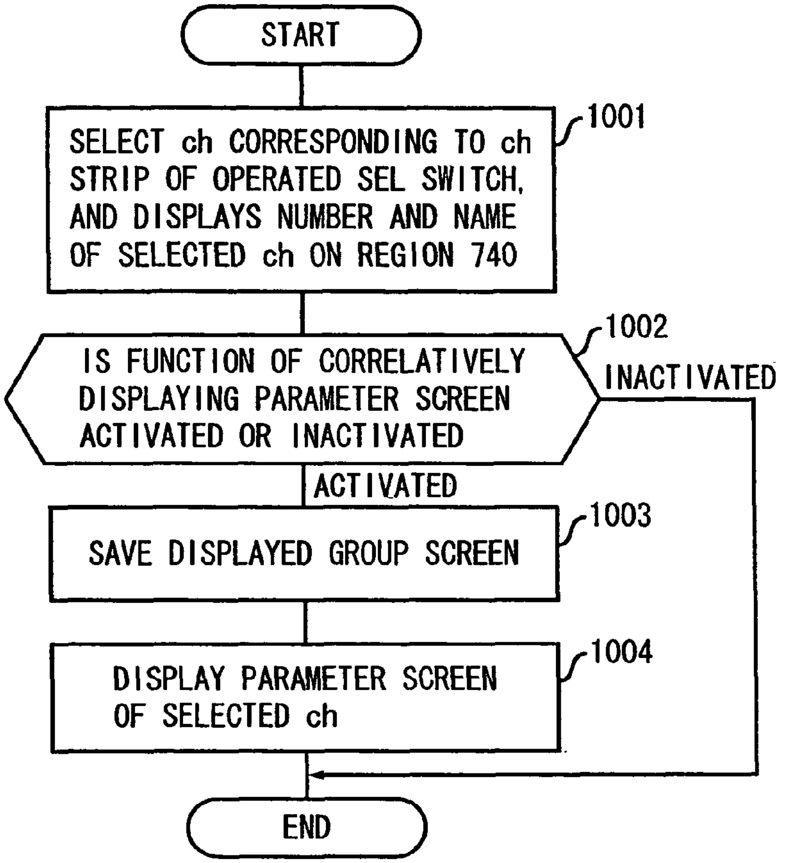
FIGS. 10(*a*), 10(*b*) and 10(*c*) are flowchart diagrams showing an operation event routine for a channel select switch.
Figure 10B:
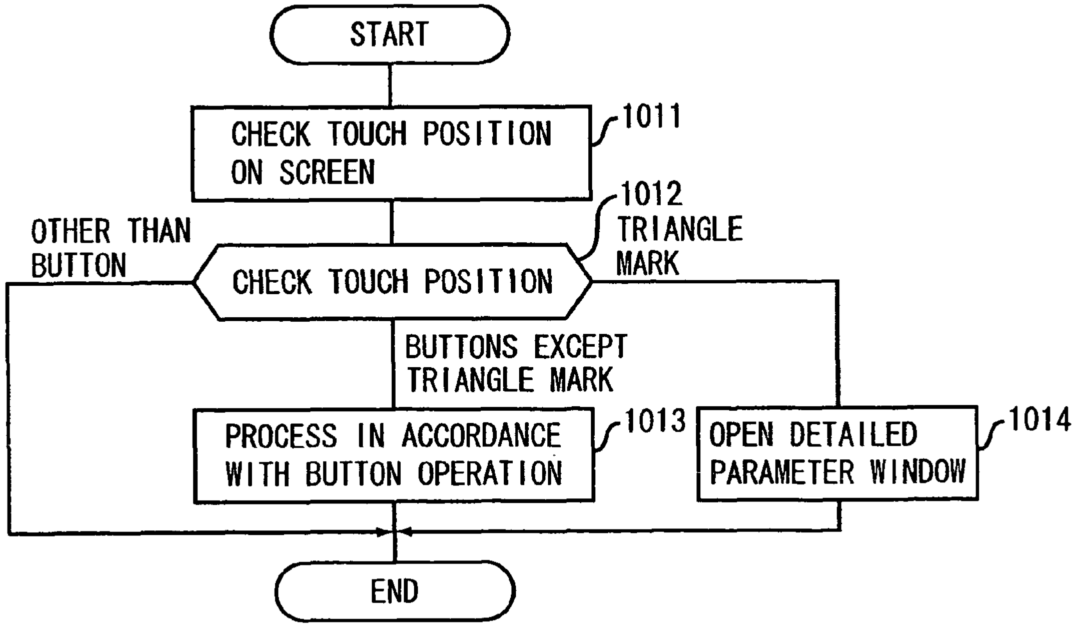
Figure 10C:
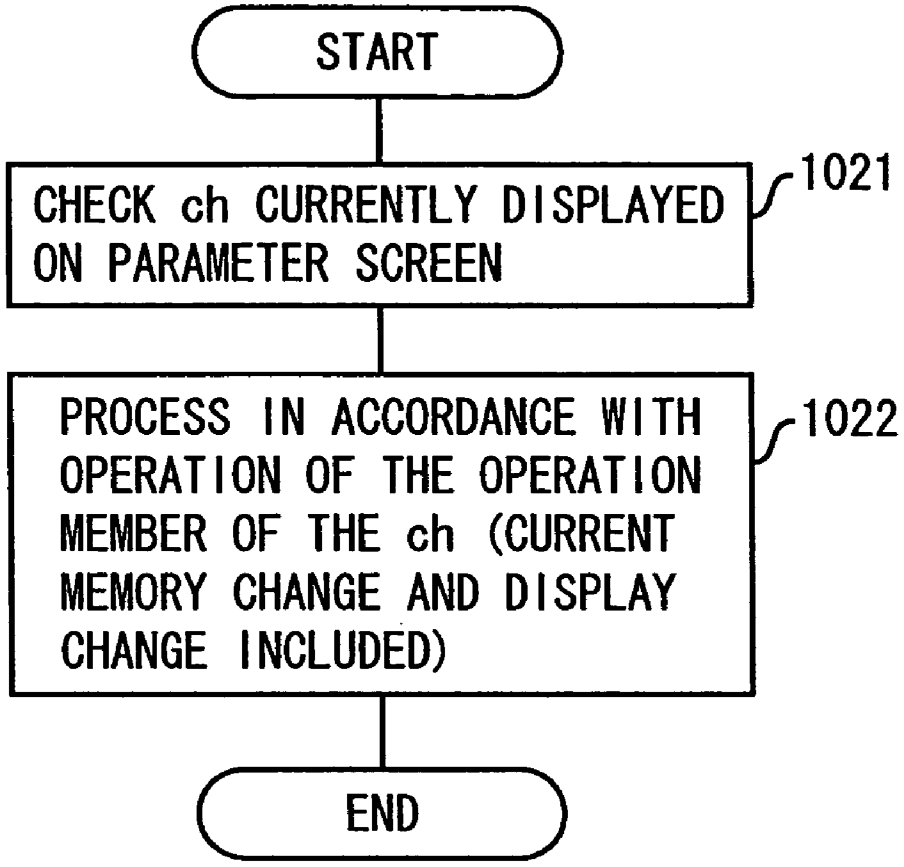

FIG. 10(*a*) shows an operation event routine for the channel select switch. This process is activated when the channel strip sections 411 to 415, and 431 to 433 in the right and left sections, and the SEL switch in the assignment channel strip section 424 are operated. In step 1001, any channel corresponding to the channel strip of the operated SEL switch is selected, and the number and name of the selected channel are displayed on the region 740. In step 1002, a determination is made whether the function of correlatively displaying the parameter screen is to be activated or inactivated. When determined as to inactivate, the procedure is ended. When determined as to activate, the displayed group screen is saved in step 1003. Next in step 1004, the parameter screen for the selected channel is displayed, and the procedure is ended.

FIG. 10(*b*) shows an operation event routine for the parameter screen. This process is activated when any touch operation is made on the parameter screen described by referring to FIG. 8. In step 1011, the touch position on the screen is checked. In step 1012, the touch position is checked, and when the touch position is an inverted triangle mark or a two-ply inverted triangle mark, any corresponding detailed parameter window is opened in step 1014, and the procedure is ended. When the position is any button other than the inverted triangle mark, the process in accordance with the button operation is executed in step 1013, and the procedure is ended. When the position is no button, the procedure is ended as it is.

FIG. 10(*c*) shows an operation event routine for the operation member in the parameter operation section. This process is activated when any of the operation members (rotary encoders) of the parameter operation section 422 described by referring to FIG. 6(*a*) is operated. Note here that the push operation event for the rotary encoder is processed by the routine of FIG. 9(*d*), and thus any other operation (rotation operation) is included. In step 1021, the currently-selected channel (channel displayed in the region 740) is checked. In step 1022, for the channel, the process is executed in accordance with the operation of the operated operation member, and the procedure is ended. This process is of changing the parameter value corresponding to the operation member on the current memory, and if required, a process of changing the display is included. Here, even if the currently-displayed is a group screen, the processes of steps 1021 and 1022 are executed.

Note here that in the above-described embodiment, exemplified is a digital mixer in which a console for user operation and a signal processing section in charge of mixing process in accordance with the user operation are provided in one body. The present invention can be applied to a console of a digital mixer system in which the console and a signal processing section are separately provided. That is, the signal processing section is not an essential component for the present invention.

The inverted triangle mark and the two-ply inverted triangle mark in the above embodiment are no more than examples, and any other marks, boxed frame design, or base color tone change will do. If the operation is repeatedly performed, the timing for the parameter window to open is recognized naturally, and thus there will cause no trouble if such display is eliminated.

In the above embodiment, the channel strips are each provided with an SEL switch (channel selection operation member). The SEL switch is not necessarily belong to the channel strip. For example, only the SEL switches for the channels may be collected at a position on the external panel. Alternatively, from the external panel, the input channel strips 411 to 415, 431, and 432, and the output channel strips 433 may be entirely or partially eliminated so that the panel is reduced in size. The SEL switches for thus eliminated channel strips may be disposed in the vacant space on the panel (e.g., left side of the assignment channel strip).

In the above embodiment, in accordance with the operation of the SEL switches of the channel strips, or push operation of the knobs of the parameter setting operation section, the parameter screen of the selected channel is displayed or saved. Alternatively, a switch for displaying the parameter screen may be separately provided on the external panel, or a button for displaying a parameter screen may be displayed on the display region 720 so as to display (or save) the parameter screen based on the switch or button operation.

The invention claimed is:

1. An audio mixing apparatus, having an operation panel, which inputs audio signals, mixes the audio signals after application of various types of signal processing to the audio signals, and outputs the mixed audio signals, the audio mixing apparatus comprising:

a plurality of channels provided at input side and output side of the mixing apparatus, the channels at the input side of the audio mixing apparatus being used for applying the various types of the signal processing to the audio signals input to the audio mixing apparatus, the plurality of the channels being grouped into a multiple of groups such that each group contains n channels where n is an integer of 2 or greater;

a current memory that stores a plurality of parameters for each of the channels for defining the signal processing applied by each channel;

a multiple of channel strip sections disposed on the operation panel in correspondence to the multiple of the groups of the channels at the input side, each channel strip section including n channel strips in correspondence to the n channels of the corresponding group, each channel strip including controls being operable by a user to change values of the parameters for the corresponding channel;

a display section provided on the operation panel;

an assignment channel strip section being disposed in front of the display section on the operation panel, and including n assignment channel strips each having controls including a knob and a fader;

a group selection operation section including a multiple of group selection controls, which correspond to the multiple of the groups of n channels at the input side and also correspond to the multiple of the channel strip sections and which are arranged at positions within the group selection operation section; said positions being associated with positions of the channel strip sections of the corresponding groups disposed on the operation panel;

a group selection section that, when one of the group selection controls in the group selection operation section is operated by the user, selects a group of n channels at the input side corresponding to the operated group selection control, then assigns the n channels of the selected group to the n assignment channel strips in the assignment channel strip section, and displays on the display section a group screen that presents values of the parameters only for the n channels of the selected group assigned to the assignment channel strip section; and a parameter control section that, when the controls of the channel strips of each channel strip section are operated by the user, changes the values of the parameters for the n channels of the channel strip section stored in the current memory, and when the controls of the assignment channel strips are operated by the user, changes the values of the parameters, for the channels assigned to the assignment channel strips, stored in the current memory.

2. The audio mixing apparatus according to claim 1, wherein graphical images of an on/off control and a level control are disposed on the group screen displayed on the display section by the group selection section, for each of the n assignment channel strips in the assignment channel strip section, the values of the plurality of the parameters for the n channels are presented on the group screen such that the image of the on/off control for an assignment channel strip represents a value of a on/off parameter for a channel assigned to the assignment channel strip and the image of the level control for an assignment channel strip represents a value of a level parameter for a channel assigned to the assignment channel strip, the display section is provided with a position sensor that can detect an operation position where the user operates on the display section, and when the position sensor detects an operation position, the parameter control section operates in case that the on/off control is located at the detected operation position, for inverting the value of the on/off parameter corresponding to the on/off control, and for inverting a display state of the on/off control according to the inverted value.

3. The audio mixing apparatus according to claim 1, wherein graphical images of an on/off control and a plurality of level controls are disposed on the group screen displayed on the display section by the group selection section, for each of the n assignment channel strips in the assignment channel strip section, the values of the plurality of the parameters for the n channels are presented on the group screen such that the image of the on/off control for an assignment channel strip represents a value of a on/off parameter for a channel assigned to the assignment channel strip and the image of each of the level controls for an assignment channel strip represents a value of a level parameter for a channel assigned to the assignment channel strip, the display section is provided with a position sensor that can detect an operation position where the user operates on the display section, and when the position sensor detects an operation position, the parameter control section operates in case that one of the level controls corresponding to one of the assignment channel strips is located at the detected operation position, for selecting n level controls of the n channels assigned to the n assignment channel strips, corresponding to the operated level control, and assigns n level parameters for the n channels corresponding to the selected n level controls to the respective knobs of the n assignment channel strips such that the values of the n level parameters for the channels are controlled by the user operating the n level controls.

4. The audio mixing apparatus according to claim 1, wherein the display section comprises a touch panel provided with a position sensor that can detect an operation position where the user operates on the touch panel.

5. The audio mixing apparatus according to claim 1, wherein the group selection operation section includes an output group selection control that corresponds to a group of n channels at the output side of the audio mixing apparatus, at a position, associated to positions of the assignment channel strip section and the display section on the operation panel, in the group selection operation section, when the output group selection control is operated by the user, the group selection section selects the group of n channels at the output side corresponding to the output group selection control and assigns the n channels of the selected group to the n assignment channel strips in the assignment channel strip section.

6. An audio mixing apparatus, having an operation panel, which inputs audio signals, mixes the audio signals after application of various types of signal processing to the audio signals, and outputs the mixed audio signals, the audio mixing apparatus comprising:

a plurality of channels that are provided for applying the various types of the signal processing to the audio signals input to the audio mixing apparatus, the channels being grouped into a multiple of groups each including n channels where n is an integer of 2 or more;

a current memory that stores a plurality of parameters for each of the channels for defining the signal processing applied by each channel;

a display section provided on the operation panel;

a plurality of channel selection controls that are provided in correspondence to the plurality of the channels, and that are operated by a user to select one of the plurality of the channels;

a multiple of group selection controls that are provided in correspondence to the multiple of the groups, and that are operated by the user to select the corresponding groups of the channels;

an assignment channel strip section that is disposed in front of the display section on the operation panel, and that includes n assignment channel strips arranged in a lateral direction, each assignment channel strip being provided with controls for changing values of parameters for the channels in the current memory;

a parameter operation section that is disposed on a left side of the display section on the operation panel, and that is provided with a plurality of assignment knob controls for changing values of the parameters for the selected channel in the current memory;

a group selection section that selects one of the groups when the corresponding group selection control is operated by the user, and that assigns the n channels of the selected group to the n assignment channel strips in the assignment channel strip section;

a first display control section that, when one of the groups is selected by the group selection section, displays on the display section a group screen that presents values of the parameters for the n channels of the selected group in such a manner that the respective parameters for the channels assigned to the respective assignment channel strips are displayed at positions in the group screen corresponding to the positions of the respective assignment channel strips in the assignment channel strip section;

a first parameter control section that changes the values of the parameters of the assigned channels of the selected group stored in the current memory when the controls of the assignment channel strips are operated by the user;

a channel selection section that selects one of the channels when the corresponding channel selection control is operated by the user, and assigns the plurality of the parameters for the selected channel to the plurality of the assignment knob controls of the parameter operation section;

a second display control section that displays a parameter screen on the display section in response to a predetermined screen switch command, the parameter screen containing graphic images of knob controls respectively arranged at positions in the parameter screen corresponding to the positions of the respective assignment knob controls in the parameter operation section, and presenting the values of the plurality of the parameters of the channel selected by the channel selection section using the graphic images of the knob controls; and a second parameter control section that changes the values of the parameters of the selected channel stored in the current memory when the assignment knob controls are operated in the parameter operation section by the user.

7. The audio mixing apparatus according to claim 6, wherein graphical image of an on/off control is disposed on the group screen displayed on the display section by the first display control section, for each of the n assignment channel strips in the assignment channel strip section, the graphical image of the on/off control for an assignment channel strip represents a value of an on/off parameter among the parameters for the channels assigned to the assignment channel strip stored in the current memory, the display section is provided with a position sensor that can detect an operation position where the user operates on the display section, and when the position sensor detects an operation position on the group screen displayed on the display section, the first parameter control section operates in case that the graphic image of the on/off control is located at the detected operation position, for inverting the value of the on/off parameter and for changing a display state of the graphic image of the on/off control according to the inverted value.

8. The audio mixing apparatus according to claim 6, wherein graphical image of an on/off control is disposed on the parameter screen displayed on the display section by the second display control section, the graphical image of the on/off control represents a value of an on/off parameter among the parameters for the selected channel stored in the current memory, the display section is provided with a position sensor that can detect an operation position where the user operates on the display section; and when the position sensor detects an operation position on the parameter screen displayed on the display section, the second parameter control section operates in case that the graphic image of the on/off control is located at the detected operation position, for inverting the value of the on/off parameter for the currently selected channel and changing a display state of the graphic image of the on/off control of the currently selected channel according to the inverted value.

9. The audio mixing apparatus according to claim 6, wherein the plurality of the channels include input channels each of which processes an input audio signal, and output channels each of which processes an output audio signal.

10. The audio mixing apparatus according to claim 6, wherein each of the assignment knob controls provided in the parameter operation section generates a push operation event when a knob portion of the assignment knob control is pushed by the user, and the screen switch command is issued when the push operation event is issued while the group screen being displayed on the display section.

11. The audio mixing apparatus according to claim 10, wherein, when the push operation event is issued while the parameter screen being displayed on the display section, the first display control section displays on the display section a group screen same as the group screen which was displayed on the display section just before the parameter screen.

12. The audio mixing apparatus according to claim 6, wherein the screen switch command is issued when one of the channels is selected by the channel selection section.

* * * * *